United States Patent Office 3,131,221
Patented Apr. 28, 1964

3,131,221
SEPARATION AND PURIFICATION OF
FATTY ACID AMINES
Nathaniel L. Remes, Coral Gables, Fla., and Thomas W. Martinek, Crystal Lake, Ill., assignors to The Pure Oil Company, Chicago, Ill., a corporation of Ohio
No Drawing. Filed Dec. 30, 1958, Ser. No. 783,687
10 Claims. (Cl. 260—583)

This invention relates to a method of separating and purifying mixtures containing high-molecular-weight amines, particularly fatty acid amines, whereby the amines are transformed into ammonium carbamates by reaction with carbon dioxide, followed by separation of the carbamates from any liquid phase present by conventional methods such as chromatography, decantation, filtration, and centrifugation, with or without a final fractional crystallization from an added solvent. More particularly, this invention relates to a method of separating mixtures of high molecular weight aliphatic amines or fatty acid amines by conversion into solid ammonium carbamates and, after separation of any liquid phase, the solid ammonium carbamate derivatives are fractionally crystallized in accordance with their molecular weights.

It is known that mixtures of amines can be separated by distillation. Where the boiling points of the amines in a mixture are close together, this method is impractical and more complex methods are used. Among these methods are the conversion of the amines to salts or to chemical derivatives which, depending on the characteristics of the derivatives, may be more readily separated. It is also known that low-molecular-weight amines such as mono-, di-, and trimethyl amines may be converted to ammonium carbamates which are separated by distillation. Many intermediate-molecular-weight alkylammonium carabamates and low-molecular-weight derivatives are generally hygroscopic, unstable solids which decompose upon heating or attempted distillation. Some of these derivatives sublime and thus cannot be separated.

The present invention is based on the discovery that aliphatic or fatty acid amines having boiling points under conditions from about the boiling point of dodecylamine to the boiling point of a $C_{32}$ amine form carbamates on reaction with carbon dioxide which are stable solids and can be separated without the necessity of applying a fractional distillation step.

Accordingly, a primary object of this invention is to provide a method of separating and purifying high-molecular-weight amines by transformation into the corresponding alkyl-ammonium carbamates which are further separated by decantation, filtration and similar means and purified to recover the pure amines from the mixture.

Another object of the invention is to provide a method for purifying fatty acid amines.

A further object of the invention is to provide a method for separating aliphatic amines having boiling points ranging from that of dodecylamine to the boiling point of a $C_{32}$ amine from admixture with a closely boiling solvent or from each other.

Still another object of the invention is to provide a method of separating and purifying high-molecular-weight, close-boiling amines by transformation into solid carbamate derivatives which are further separatable into individual cuts containing substantially pure carbamate derivatives of the same molecular weight.

These and other objects of the invention will be described or become apparent as the invention is evolved herein.

Broadly the amines which may be separated in accordance with this invention are defined by the formulas $RNH_2$, $RR'NH$, and $RR'R'''N$, to include primary, secondary, tertiary and mixed amines wherein R, R' and R''' are the same or different alkyl groups having from 12 to 32 carbon atoms, R, R' and R''' may be selected from the group consisting of dodecyl, tridecyl, pentadecyl, hexadecyl, heptadecyl, octadecyl, nonadecyl, eicosyl, heneicosyl, docosyl, tricosyl, tetracosyl, pentacosyl, triacontanyl and hexacosyl radicals, using the normal alkane series nomenclature, and including unsaturated and polyunsaturated alkyl groups. The amines may be formed in various reactions, as by the hydrolysis of the corresponding alkyl isocyanate, Hoffman's degradation of the acid amide by a hypochlorite, hypobromite, halogen, or a base, the Curtius conversion of the corresponding acid azide by heating an acid chloride with sodium azide to give the amine hydrochloride, reduction of a cyanide or acid amide, etc. Amines of the following saturated and unsaturated fatty acids having the same number of carbon atoms are intended to come within the scope of the invention: lauric acid, myristic acid, palmitic acid, stearic acid, arachidic acid, behenic acid, lignoceric acid, lauroleic acid, myristoleic acid, palmitoleic acid, gadoleic acid, erucic acid, ricinoleic acid, linoleic acid, linolenic acid, eleostearic acid, arachidonic acid and clupanodic acid. The amines of the foregoing acids may be obtained by transformation to the acid amide followed by reduction with sodium in absolute alcohol. Other sources of mixed amines are known to the art.

In accordance with this invention, a mixture of one or more amines, as herein defined, is reacted with carbon dioxide at a temperature ranging from ambient to about 100° F. at pressures up to 50 p.s.i.g. to promote the following reactions:

(1) $2RNH_2 + CO_2 \rightarrow [RNHCO_2]^- [RNH_3]^+$
(2) $2R_2NH + CO_2 \rightarrow [R_2NCO_2]^- [R_2NH_2]^+$
(3) $R_3N + CO_2 \rightarrow$ no reaction It has been found that because of the differences in the reactivities of primary and secondary amines, the following reactions do not occur and as a result mixed carbamates are not formed:

(4) $RNH_2 + R'_2NH + CO_2 \rightarrow [RNHCO_2]^- [R'_2NH_2]^+$
(5) $RNH_2 + R'_2NH + CO_2 \rightarrow [R'_2NCO_2]^- [RNH_3]^+$ Reactions (1) and (2) take place in a non-polar solvent such as benzene, toluene, propane, and the corresponding alkylammonium carbamates precipitate from the solution. Any tertiary amine present remains in solution in the solvent, unreacted. The precipitated carbamates are next separated from the solvent phase by decantation, filtration, centrifugation or other means. The so-recovered carbamates are next separated into primary and secondary fractions by fractional crystallization from a secondary solvent which may be an alcohol, ether, ketone or aldehyde including ethanol, methanol, propanol, ethyl ether, methyl ethyl ketone, formaldehyde, etc. After adequate separation of the carbamate solid into various fractions has been accomplished, these products may be converted back to the original amines by treatment with an alkali earth or alkali metal hydroxide, carbonate, etc., or by other means known to the art.

The fatty acid amines used as the starting materials herein are generally liquids or low melting waxy solids at normal temperatures. After reaction with carbon dioxide, the corresponding alkylammonium carbamates are found to be white, non-waxy, crystalline solids. Fractional crystallization from a polar solvent is found to proceed quite readily, as opposed to those methods wherein the amines are converted to inorganic salts or chemical complexes, including complexes with diethyloxalate, because for any given amine the molecular weight of the resulting carbamate is more than twice that of the amine.

For example, if a mixture of $C_{12}$ primary amine and $C_{12}$ secondary amine is to be separated, the following conversion take place:

$$2C_{12}H_{25}NH_2 + CO_2 \rightarrow [C_{12}H_{25}NHCO_2]^- [C_{12}H_{25}NH_3]^+$$
$$2(C_{12}H_{25})_2NH + CO_2 \rightarrow [(C_{12}H_{25})_2NCO_2]^- [(C_{12}H_{25})_2NH_2]^+$$

The greater difference in molecular weights of the carbamates, as compared to the difference in molecular weight of the amines, magnifies differences in solubility and other physical characteristics. Similarly, higher-molecular-weight primary and secondary amines that differ only slightly in chain length cannot practically be separated by crystallization, but converting them to their respective carbamates makes the molecular weight, and attendant solubility, difference significant. Thus $C_{16}$ and $C_{18}$ primary amines differ by only two carbon atoms, while the corresponding carbamates differ by four carbon atoms and are more readily separable.

In order to further demonstrate the invention, the following non-limiting examples are given:

EXAMPLE 1

A synthetic mixture, containing 9.7 g. of hexadecylamine and 3.2 g. of a commercially available, crude hydrogenated tallow tertiary amine was dissolved in 250 ml. of benzene and treated with carbon dioxide until the mildly exothermic reaction had gone to completion. The carbamate, which formed as a white precipitate, was filtered and dried, yielding 9.8 of a fine, white, non-waxy solid whose melting point was 90–93° C.

The melting point of a separately prepared sample of pure hexadecylammonium hexadecylcarbamate was 94–96.5° C., and, when this pure material was mixed with the product from the above separation, there was no depression of melting point. This establishes that the process accomplished the separation of substantially pure hexadecylammonium hexadecylcarbamate.

EXAMPLE 2

A 14.8 g. sample of a crude amine mixture comprising 6% hexadecylamine, 90% octadecylamine, and 4% octadecenylamine was treated with carbon dioxide as in Example 1. The carbamate that precipitated (13.3 g.) melted at 90–92.7° C. The recrystallized material depressed the melting point of pure hexadecylammonium hexadecylcarbamate by 1.5° C., indicating that it was the $C_{18}$ carbamate rather than the $C_{16}$ carbamate. The product could be purified even further by additional recrystallization.

EXAMPLE 3

A mixture of 5-aminododecane and hexadecylamine is dissolved in about 250 ml. of toluene and treated with carbon dioxide until the mildly exothermic reaction subsides. A carbamate is formed as a precipitate and the toluene is filtered from the mixture. After drying, a substantial yield of hexadecylammonium hexadecylcarbamate having a melting point of about 90–93° C. is obtained. The 5-aminododecane remains in the filtrate.

EXAMPLE 4

A mixture of dodecylamine, di-dodecylamine and tri-dodecylamine is dissolved in about 300 ml. of xylene and the solution treated with carbon dioxide until the mildly exothermic reaction has gone to completion. The resulting carbamate mixture is maintained at room temperature and a precipitate is formed by di-dodecylammonium di-dodecylcarbamate. The xylene filtrate is removed and the temperature lowered to about 10° C. (50° F.). A second precipitate forms and is separated by filtration. The second precipitate is identifiable as dodecylammonium dodecylcarbamate by its melting point and mixed melting point values. The second filtrate contains unreacted tri-dodecylamine.

Examples of various amines that may be separated in accordance with this invention are listed in order of types:

Primary Amines

| | |
|---|---|
| Dodecylamine | Palmitylamine |
| Tridecylamine | Stearoamine |
| Pentadecylamine | Arachidylamine |
| Hexadecylamine | Behenylamine |
| Heptadecylamine | Lignocerylamine |
| Octadecylamine | Lauroleylamine |
| Monodecylamines | Myristoleylamine |
| Eicosylamine | Palmitoleylamine |
| Heneicosylamine | Gadoleylamine |
| Docosylamine | Erucylamine |
| Tricosylamine | Ricinoleylamine |
| Tetracosylamine | Linoleylamine |
| Pentacosylamine | Linolenylamine |
| Hexacosylamine | Eleostearoamine |
| Laurylamine | Arachidonylamine |
| Myristylamine | Clupanodylamine |

Secondary Amines

| | |
|---|---|
| Di-dodecylamine | Di-stearoamine |
| Di-tridecylamine | Di-arachidylamine |
| Di-pentadecylamine | Di-behenylamine |
| Di-hexadecylamine | Di-lignocerylamine |
| Di-heptadecylamine | Di-lauroleylamine |
| Di-octadecylamine | Di-myristoleylamine |
| Di-monodecylamine | Di-palmitoleylamine |
| Di-eicosylamine | Di-gadoleylamine |
| Di-heneicosaneamine | Di-erucylamine |
| Di-docosylamine | Di-ricinoleylamine |
| Di-tricosylamine | Di-linoleylamine |
| Di-tetracosylamine | Di-linolenylamine |
| Di-pentacosylamine | Di-eleostearoamine |
| Di-hexacosylamine | Di-arachidonylamine |
| Di-laurylamine | Di-clupanodylamine hydrogenated tallow secondary amine |
| Di-myristylamine | |
| Di-palmitylamine | |

Tertiary Amines

| | |
|---|---|
| Tri-dodecylamine | Tri-palmitylamine |
| Tri-tridecylamine | Tri-stearylamine |
| Tri-pentadecylamine | Tri-arachidylamine |
| Tri-hexadecylamine | Tri-behenylamine |
| Tri-heptadecylamine | Tri-lignocerylamine |
| Tri-octadecylamine | Tri-lauroleylamine |
| Tri-monodecylamine | Tri-myristoleylamine |
| Tri-eicosylamine | Tri-palmitoleylamine |
| Tri-heneicosylamine | Tri-gadoleylamine |
| Tri-docosylamine | Tri-erucylamine |
| Tri-tricosylamine | Tri-ricinoleylamine |
| Tri-tetracosylamine | Tri-linoleylamine |
| Tri-pentacosylamine | Tri-linolenylamine |
| Tri-hexacosylamine | Tri-eleostearylamine |
| Tri-laurylamine | Tri-arachidonylamine |
| Tri-myristylamine | Tri-clupanodylamine |

In applying the method to a mixture of amines, it will be found that during the fractional crystallization the higher-molecular-weight amines of the primary and secondary variety in the form of ammonium carbamates usually crystallize first, depending on their concentration. As between $C_{12}$ and $C_{20}$ fatty acid amines having approximately the same molecular weight, such separations are accomplished by gradual reduction in temperature until a first crystallization occurs. At this point the solution is held at a constant temperature to allow crystal growth to proceed. After separation of the first ammonium carbamate salt, the process of temperature lowering is continued until the remaining lower-molecular-weight ammonium carbamate salt crystallizes. Any tertiary amine in the beginning mixture remains unreacted during the carbon dioxide treatment and is separated in the filtrate during the removal of the precipitated carbamates.

The reaction with carbon dioxide is conducted at a temperature below the decomposition temperature of the corresponding carbamate. The temperature of this reaction may range from room to several degrees below the melting point of the carbamates, i.e. 100° F. Pressures up to 50 p.s.i.g. may be applied. This reaction proceeds to completion in a short time. It is only necessary to bring the carbon dioxide and amine mixture together in relatively intimate contact in order to obtain a reaction. Carbon dioxide atmospheres containing from about 20% by volume to 100% by volume of the reactant gas may be used. Air forms a convenient carrier for carbon dioxide. The reaction is conducted using a concentration of the amine mixture in an inert solvent ranging from about 5% by volume to 50% by volume. The steps of decantation and filtration are carried out in the manner known to the art. The solid ammonium carbamates may be separated by chromatography, or on a mat of asbestos using a slight vacuum to draw the liquid phase through. Where centrifugation is applied, an ordinary hand centrifuge may be used. The purpose of this initial separation is to recover in the filtrate any tertiary amines that may be present in the mixture, and to transfer the ammonium carbamate solids to a secondary solvent to aid in fractional crystallization. Polar solvents are more conducive to this type of separation than non-polar solvents.

The steps of fractional crystallization are carried out in a manner known in the art. No particular precautions need be taken. Various refrigeration means may be used to control the temperature during these steps. The term ammonium carbamate salt as used herein is intended to include the reaction products of primary and secondary $C_{12}$–$C_{32}$ amines with carbon dioxide as herein-described. Crystal seeding may be used where found expedient. A feature of this invention is the ease with which the separate amines can be liberated from their carbamates. For this purpose it is only necessary to react the carbamate with a base at ambient temperatures or by heating the carbamates above their melting points in contact with a base. The base used may comprise an alkali metal hydroxide such as sodium hydroxide, potassium hydroxide, etc., or a metal oxide such as calcium or magnesium oxide may be used in aqueous solution. Another method of transforming the carbamates back to the amine form would be through contact with an ion-exchange resin such as Amberlite IR–400. Having thus described the invention, the only limitations attaching thereto appear in the appended claims.

What is claimed is:

1. The method of separating mixtures of aliphatic unsubstituted mono amines and at least one primary amine, at least one secondary amine and at least one tertiary amine, said primary and secondary amines differing from each other by more than one carbon atom and the aliphatic radicals of said amines containing from 12 to 32 carbon atoms which comprises, reacting said mixture with carbon dioxide in the presence of a non-polar hydrocarbon solvent at ambient temperature to a temperature no greater than about 100° F. but below the decomposition temperature of the carbamate derivatives of said primary and secondary amines and at a pressure up to about 50 p.s.i.g. to convert said primary and secondary amines to the corresponding alkylammonium carbamates in solid form, separating the alkylammonium carbamates from said reaction mixture, subjecting said alkylammonium carbamate mixture to fractional crystallization in the presence of a polar solvent of the group consisting of methanol, ethanol, propanol, ethylether, methylethyl ketone and formaldehyde to form separate solid fractions consisting of the alkylammonium carbamates of the said primary amines and the alkylammonium carbamates of said secondary amines and converting said separate fractions to the original primary and secondary amines.

2. The method in accordance with claim 1 in which said non-polar hydrocarbon solvent is of the group consisting of propane, benzene, toluene and the xylenes.

3. The method in accordance with claim 1 in which said separate alkylammonium carbamate fractions are individually converted to the original amines by reaction with a base of the group consisting of alkaline earth metal hydroxides, alkaline earth metal carbonates, alkali metal hydroxides and alkali metal carbonates.

4. The method in accordance with claim 1 in which said mixture of amines comprises a mixture of hexadecylamine and crude hydrogenated tallow tertiary amine.

5. The method in accordance with claim 1 in which said mixture of amines comprises a mixture of about 6% hexadecylamine, 90% octadecylamine and 4% octadecenylamine.

6. The method in accordance with claim 1 in which said mixture of amines comprises a mixture of 5-aminododecane and hexadecylamine.

7. The method in accordance with claim 1 in which said mixture of amines comprises a mixture of dodecylamine, di-dodecylamine and tri-dodecylamine.

8. The method in accordance with claim 1 in which said mixture contains at least one primary amine and at least one secondary amine.

9. The method in accordance with claim 1 in which said mixture contains at least one primary amine and at least one tertiary amine.

10. The method of separating a mixture of amines consisting of dodecylamine, di-dodecylamine, and tri-dodecylamine which comprises dissolving said mixture in a non-polar organic solvent of the group consisting of propane, benzene, toluene and xylenes, reacting the resulting solution with carbon dioxide at ambient temperature to a temperature not greater than about 100° F. but below the decomposition temperature of the carbamate derivatives until the exothermic reaction subsides, separating solid di-dodecylammonium, di-dodecylcarbamate from the reaction mixture and recovering a first filtrate, cooling said first filtrate to a temperature of about 50° F., recovering solid dodecylammonium, dodecylcarbamate and a second filtrate therefrom, separating unreacted tri-dodecylamine from said second filtrate and separately treating said carbamates with a strong base of the group consisting of alkaline earth metal hydroxides, alkaline earth metal carbonates, alkali metal hydroxides and alkali metal carbonates to reform the amines therefrom.

References Cited in the file of this patent

UNITED STATES PATENTS

| | | |
|---|---|---|
| 2,681,332 | Gorin | June 15, 1954 |
| 2,755,282 | Hachmuth | July 17, 1956 |
| 2,943,093 | Joly et al. | June 28, 1960 |

OTHER REFERENCES

Fichter et al.: "Berichte Deut. Chem.," vol. 44 (1911), pp. 3481–3485.

Werner: "Journal of the Chemical Society," vol. 117, pp. 1046–1053 (1920).

Kendall: "Smith's Inorganic Chemistry," New York, D. Appleton-Century Co., Inc., 2nd revised edition, 1937, pp. 513, 696 and 697.

Morton: "Laboratory Technique in Organic Chemistry," page 163 (1938).

Richter: "Organic Chemistry," vol. 1, pp. 193–196 (1947).